ial No. 621,503, now abandoned.

2,993,795
LIVER PROCESSING METHOD AND PRODUCT
Edward L. Heuck, 233 E. Grand Ave., South San Francisco, Calif.
No Drawing. Filed Jan. 24, 1958, Ser. No. 710,849
13 Claims. (Cl. 99—194)

This application is a continuation-in-part of applicant's parent case Serial No. 621,503, now abandoned.

The present invention relates to edible animal livers which are of good quality for eating but which may be of inferior quality as to tenderness, and is concerned more particularly with a process for providing liver patties of such material which are substantially raw but which are tenderized so as to be readily edible when cooked.

The problem in meat processing plants of disposing of inferior grade meat products such as livers which are of good edible quality but which inherently contain tough and sinewy constituents is quite severe and heretofore such livers have been disposed of at no or small profit. The process of the instant invention and the product provided thereby enables the marketing of such livers in edible tender form and therefore changes the small profit operation in the handling of such livers to a larger profit operation, as well as increasing the available meat supply from a given number of livestock and providing the livers in more edible form and of improved flavor characteristics. One particular characteristic feature of livers is that when ground at ambient room temperatures the resulting product is substantially liquid in form and will flow so that it inherently prevents the marketing of the product by the same methods and processes as hamburger meat for example. The process of the instant invention solves this problem by handling the liver entirely in a frozen state, and by providing a strengthened layer encasing the raw liver so that it can be handled readily in cooking and will retain the desirable characteristic of being cooked rare, medium rare or well done according to the dictates of the taste of the user.

In accordance with my invention the raw cow livers, for example, are frozen to a solid hard state at a temperature preferably below zero degrees Fahrenheit. Thereafter the livers while so frozen are comminuted by grinding, slicing or chopping to cut through all of the tough sinews and reduce them to a finely divided form. Any suitable known comminuting mechanism can be employed to carry out this step of the process.

After the livers are thoroughly comminuted they are then formed into a loaf while frozen, such as for example by stuffing into a sausage casing of a desired size, or into another suitable container. As a part of this operation the loaf is formed to a desired size and of uniform dimensions. After filling into the container, the liver is again subjected to a freezing operation preferably of below zero degrees Fahrenheit to maintain the solid frozen state and to prevent any tendency of the loaf to be deformed by melting while standing.

Thereafter the frozen loaf is subjected while frozen to a slicing operation to form frozen patties of raw liver of a desired thickness. This slicing operation can be performed in any suitable conventional slicing machine.

These patties while still frozen are subjected to a cooking operation or a searing operation to provide a thin outer strengthening layer in which the proteins have been coagulated to give strength to the patty to hold its shape, while at the same time the interior of the patty is maintained raw.

This step may be performed in any one of several ways and the exact temperature and time of the searing treatment is not critical as long as an outer strengthened layer of the patty is provided by the cooking operation. It is preferred to perform the searing step by subjecting each side of the patty either simultaneously or sequentially to an open or direct flame, and successful searing operations on patties have been made under an open flame of between about 700° F. and 3400° F. for time periods varying from about 11 to 1½ seconds, respectively. Preferably, the patties are passed through a flame zone or carried past a flame on a conveyor.

The searing step can also be performed by passing the patty through or placing it in an oven employing reflected heat and successful searing operations have been performed by subjecting the patty to heat ranging from 1000° F. to 2400° F. for a period varying from 15 to 7 seconds, respectively.

The searing step can also be performed by deep frying in grease at temperatures of from about 370° F. to 410° F. for periods of from about 20 seconds to 15 seconds.

The searing operation can also be performed by frying in a pan or skillet and successful searing operations have been performed with the temperature in the skillet of from 370° F. to 400° F. for a time period of from 20 seconds to 15 seconds.

In any method of searing the outer layer to provide strength it should be carried out without substantial thawing of the raw inside of the patty.

After the above searing step, the patties are again quick frozen for further handling during marketing.

Because of the strength of the outer cooked layer of the patties, after delivery to the place of cooking they need not be kept under extremely low refrigeration, and ordinary refrigerator temperatures of slightly below freezing will hold them for a short interval of time before actual cooking. The strengthened outer layer also enables easy handling of the patties during the cooking operation, and they can be turned readily while frying. The patties also being raw on the interior can be cooked to a desired state of rareness.

If desired, at the time of comminuting the livers, certain other compatible comminuted products can be added, or such products can be added after comminution and before packing in loaf form, where it is desired to produce patties of a slightly varied taste or character. For example pork products such as comminuted bacon ends and hog jowls, or beef bacon, can be added during the comminuting step, thereby providing as an end product a mixed liver patty together with some other compatible ingredient. Successful patties have been produced employing from about 15% to 35% by weight of bacon ends, from about 15% to 35% by weight of hog jowls, or from about 15% to 35% by weight of beef bacon.

It will be seen from the above description that I have provided a new process and new product involving the use of animal livers which results in enhancing the value of the livers as a meat product, makes the livers more readily available in edible form and of uniform size, and also provides an enhanced flavor characteristic approaching that of calves liver for example.

While I have described my invention as carried out in a preferred manner and as resulting in a preferred product, it will be apparent that the invention is capable of variation and modification so that its scope should be limited only by the scope of the claims appended hereto.

I claim:
1. The process of preparing raw animal livers which comprises freezing the livers to a solid state, then comminuting the livers to eliminate any toughness therein while maintaining the livers frozen, thereafter packing the comminuted liver into a loaf form while maintaining the frozen state thereof, slicing the loaf to provide frozen patties of a desired thickness, searing the outer surface of each patty to provide a cooked coagulated layer enclosing raw liver, and again subjecting the patties to a freezing operation.

2. The process of preparing raw animal livers which comprises freezing the livers to a solid state, then comminuting the livers to eliminate any toughness therein while maintaining the livers frozen, thereafter packing the comminuted liver into a loaf form while maintaining the frozen state thereof, slicing the loaf to provide frozen patties of a desired thickness, coagulating the outer surface of each patty to provide a strengthened layer enclosing raw liver, and again subjecting the patties to a freezing operation.

3. The process of preparing raw animal livers as recited in claim 2 which includes the step of adding a pork product to the comminuted livers before being packed in loaf form.

4. The process of preparing raw animal livers which comprises providing animal livers, freezing the livers to a solid state, then comminuting the livers to eliminate any toughness therein while maintaining the livers frozen, thereafter packing the comminuted liver into a loaf form while maintaining the frozen state thereof, slicing the loaf to provide patties of a desired thickness while maintaining the liver frozen, and again subjecting the patties to a freezing operation.

5. The process of preparing raw animal livers as recited in claim 4 which includes the step of adding a pork product to the comminuted livers before being packed in loaf form.

6. As an article of manufacture a food product comprising a frozen patty of comminuted raw animal livers having substantially its entire outer surface layer cooked, thereby providing a strengthened outer layer to hold the patty shape while being handled in marketing and cooking, and providing an interior portion of raw liver so that the patty can be cooked to a desired degree.

7. As an article of manufacture, a food product comprising a frozen patty of comminuted raw animal livers having an interior portion of raw liver, and having a strengthened outer layer encasing said inner layer.

8. As an article of manufacture a food product as recited in claim 7 in which the comminuted raw animal livers have mixed therewith a comminuted food product.

9. A food product comprising a frozen patty of comminuted raw animal livers.

10. As an article of manufacture a food product as recited in claim 9 in which the comminuted raw animal livers have mixed therewith a comminuted food product.

11. The process of preparing raw animal livers which comprises freezing the raw livers to a solid state, then comminuting the raw livers to eliminate any toughness while maintaining the raw livers frozen, thereafter packing the comminuted raw liver into loaf form while maintaining the frozen state thereof, slicing the loaf to provide frozen patties of a desired thickness of raw liver, searing the outer surface of each frozen patty to provide a cooked coagulated layer enclosing raw liver by subjecting it to temperatures of from about 370° F. to about 3400° F. for a time of from about 20 seconds to about 1½ seconds, and again subjecting the patties to a freezing operation.

12. The process of preparing raw animal livers which comprises freezing the raw livers to a solid state, then comminuting the raw livers to eliminate any toughness therein while maintaining the raw livers frozen, thereafter packing the comminuted raw liver into loaf form while maintaining the frozen state thereof, slicing the loaf to provide frozen patties of a desired thickness of raw liver, searing the outer surface of each frozen patty by subjecting each side of the patty to an open flame at a temperature of from about 700° F. to about 3400° F. for periods varying from about 11 seconds to about 1½ seconds.

13. The process of preparing raw animal livers which comprises freezing the raw livers to a solid state, then comminuting the raw livers to eliminate any toughness therein while maintaining the raw livers frozen, thereafter packing the comminuted raw liver into a loaf form while maintaining the frozen state thereof, slicing the loaf to provide frozen patties of a desired thickness, searing the outer surface of each patty by subjecting each side of a patty to reflected heat in an oven at temperatures of from about 1000° F. to about 2400° F. for periods varying from about 15 seconds to about 7 seconds respectively to provide a cooked coagulated layer enclosing raw liver, and again subjecting the patties to a freezing operation.

References Cited in the file of this patent
UNITED STATES PATENTS

| | | |
|---|---|---|
| 1,009,953 | Boyle | Nov. 28, 1911 |
| 2,670,296 | Tansley | Feb. 23, 1954 |
| 2,798,814 | Rivoche | July 9, 1957 |
| 2,824,003 | Schieber | Feb. 18, 1958 |
| 2,852,395 | Gaumer | Sept. 16, 1958 |

OTHER REFERENCES

"Modern Encyclopedia of Cooking," 1949, vol. II, by Meta Given, published by J. G. Ferguson and Associates, Chicago, pp. 1109 to 1116, inclusive.

"Quick Frozen Foods," May 1955, page 85.